United States Patent [19]
McMurtry et al.

[11] 4,209,206
[45] Jun. 24, 1980

[54] ROTARY MOUNTING FOR USE ESPECIALLY WITH MEASURING APPARATUS

[75] Inventors: David R. McMurtry, Wotton-under-Edge; Lionel J. Ackery, Bristol, both of England

[73] Assignees: Rolls-Royce Limited, London; Renishaw Electrical Limited, Gloucestershire, both of England

[21] Appl. No.: 932,625

[22] Filed: Aug. 10, 1978

[30] Foreign Application Priority Data

Aug. 20, 1977 [GB] United Kingdom ............... 35019/77

[51] Int. Cl.² .......................... F16C 32/06; B23Q 3/02
[52] U.S. Cl. .................................... 308/9; 33/174 Q; 33/DIG. 2; 269/20
[58] Field of Search ..................... 308/9, 170, DIG. 1; 33/DIG. 2, 174 Q; 269/20, 57, 83, 85, 296, 309, 311, 312

[56] References Cited

U.S. PATENT DOCUMENTS

| | | | |
|---|---|---|---|
| 1,488,564 | 4/1924 | Steinle | 33/174 Q |
| 2,941,300 | 6/1960 | Allen et al. | 33/174 Q |
| 3,312,510 | 4/1967 | Brehm | 308/9 |
| 3,813,789 | 6/1974 | Shelton | 33/DIG. 2 |

FOREIGN PATENT DOCUMENTS 944689 12/1963 United Kingdom ..................... 269/20

*Primary Examiner*—Richard R. Stearns
*Attorney, Agent, or Firm*—Stevens, Davis, Miller & Mosher

[57] ABSTRACT

A rotary mounting for supporting a workpiece for rotation has a number of support members which are small in relation to the workpiece and each of which forms an aerostatic bearing with a flat surface of a table. The support members are connected by respective links to a radial bearing connected to the table and supporting the mounting for rotation.

12 Claims, 6 Drawing Figures

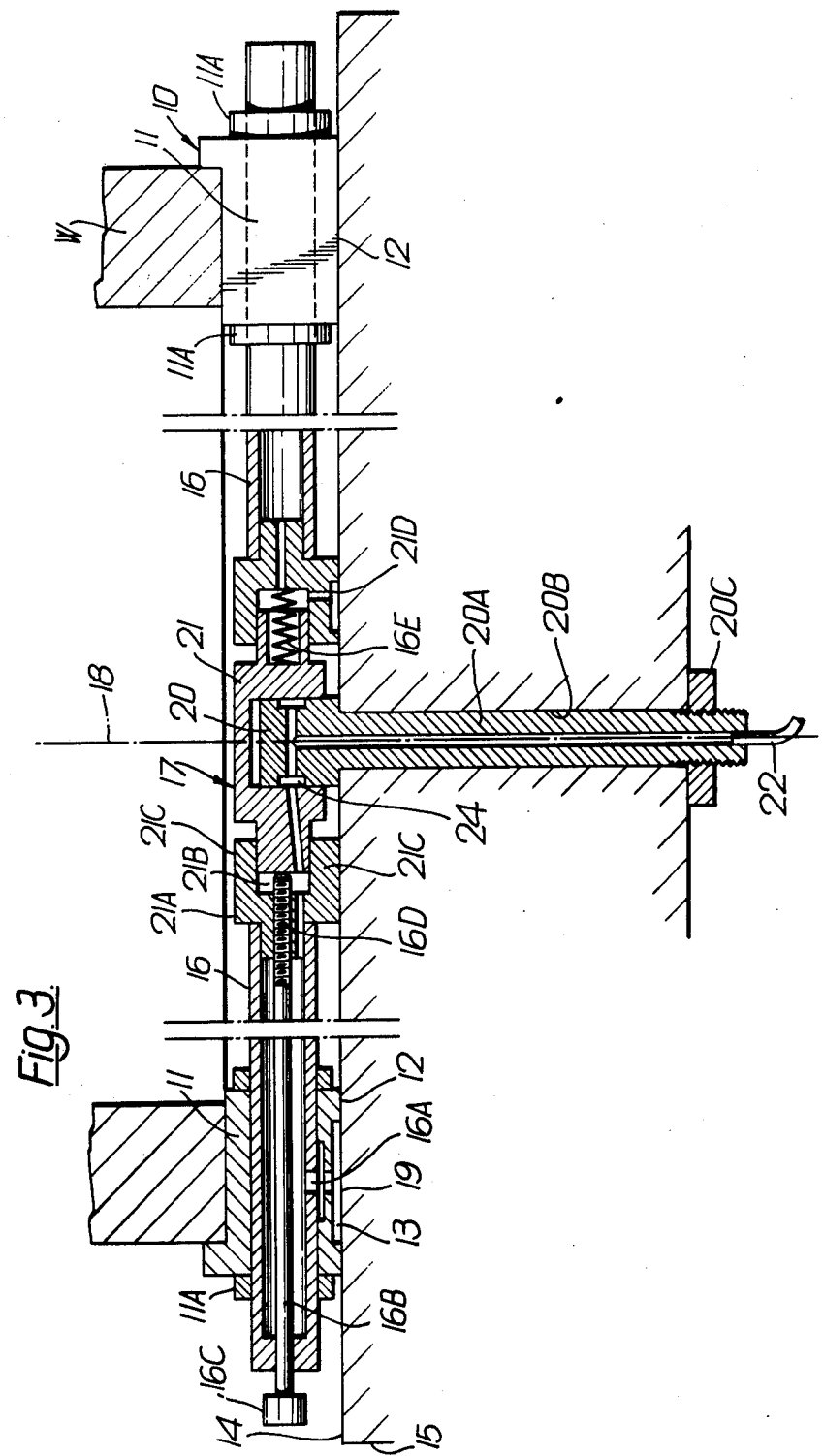

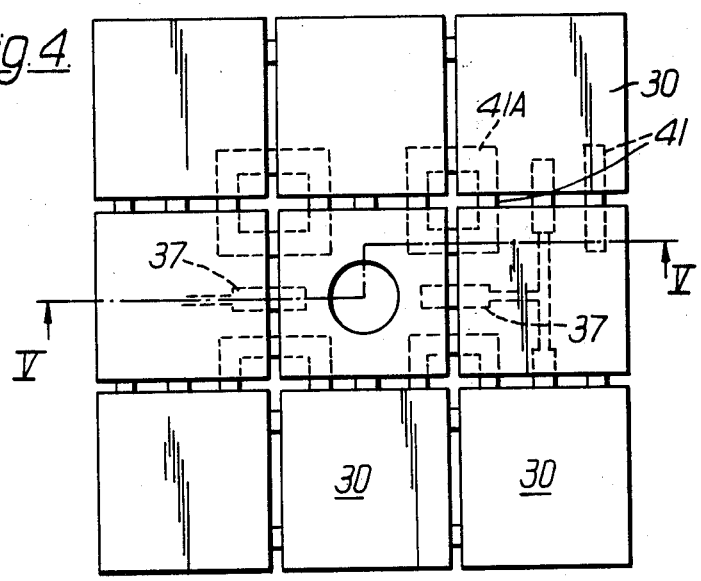
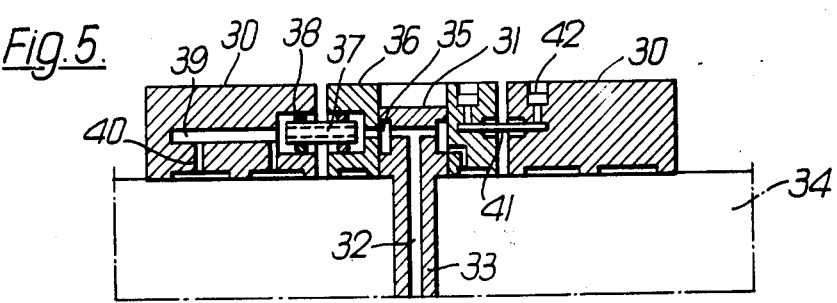
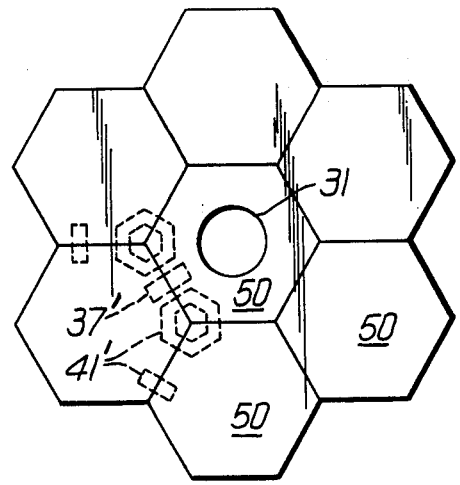

ROTARY MOUNTING FOR USE ESPECIALLY WITH MEASURING APPARATUS

This invention relates to a rotary mounting especially for use in measuring apparatus.

It is known, e.g. for measuring circularity of a circular workpiece, to support the workpiece on a table assembly comprising a mounting and a base on which the mounting is supported for rotation. In particular, the known mounting is in the form of a disc and the assembly comprises a radial bearing supporting the disc for rotation relative to the base, and aerostatic bearings between confronting surfaces of the disc and the base to support the disc axially.

In a typical use, the workpiece is mounted on the disc and the latter is rotated, manually or by a motor, to move the periphery of the workpiece past a stationary measuring device, e.g. a gauge, with a view to determining the circularity of the workpiece. The aerostatic bearings provide for virtually frictionless support of the disc on the base even when using a relatively heavy workpiece. As a result the disc can be rotated easily with a smooth action and the radial bearing, which controls the concentricity of the rotary motion, can be a relatively small diameter, and therefore accurate, bearing at the centre of the disc.

Hitherto, such tables have been confined mostly to relatively small diameters, say below 50 cm because, when it is desired to make larger assemblies, it becomes progressively more difficult to make the confronting surfaces of the disc and the base to an acceptable flatness tolerance. It will be appreciated that the hover height of the aerostatic bearings, i.e. the distance by which the air pressure raises the disc from the base, is not intended to be more than is necessary to relieve surface friction, e.g. not more than say 0.0025 mm. The flatness tolerance of the two co-operating surfaces must be less than that hover height as otherwise the two surfaces will rub during rotation of the disc.

Since a good flatness tolerance requires substantial thickness of the base and disc, these components become very heavy in the case of larger diameter assemblies. As a result, the disc has undesirably high inertia as regards rotation and the assembly as a whole becomes unduly heavy to handle. Further, it is the practice to place the assembly on top of the granite table of a co-ordinate measuring machine so that the measuring equipment of that machine may be used on a workpiece supported by the rotary assembly. If the rotary assembly is very heavy it is correspondingly difficult to lift it on and off the granite table. Also, inasmuch as the rotary assembly has a thick base and disc, it may have a height which creates problems as regards overhead clearance between the workpiece resting on the disc and the overhead structure of the measuring machine. In view of these circumstances it has been found to be costly and otherwise difficult to make and use relatively large rotary assemblies for measuring operations. It is an object of this invention to overcome or reduce those difficulties.

According to this invention there is provided a rotary mounting for use on a base having a flat upper surface, the mounting comprising a radial bearing having two relatively rotatable members, a plurality of workpiece support members having respective flat support surfaces by which the mounting is engageable, in use, with said flat upper surface of the table, each support member having in the support surface thereof a recess connectable, in use, to a supply of compressed air, and links connecting each said support member to one of the members of said radial bearing.

Since the support surfaces of the support members are small compared to the single support surface of a said disc, they are correspondingly relatively easy to make to a good flatness tolerance. The provision of the links avoids the need for a large structure such as a said disc. Preferably the links are rigid in the direction of their length but are flexible in the direction of the axis of said bearing, i.e. in the direction perpendicular to the surfaces of said table. This flexibility enables the links to accommodate small differences in height which the surfaces of the support members may have relative to the surface of a said table. Such differences may occur due to manufacturing tolerance and may be too large for the requirements of aerostatic bearings. However, these differences are small in relation to the ability of appropriately dimensioned said links to bend within the elastic limit of the material, e.g. spring steel, of which they may be made.

The links may be bar or rod material of solid or tubular, round or rectangular cross-section, use being made of the intrinsic resilience of the material. However, the term "flexible link" includes a link having pivoted joints. The actual manufacturing tolerance, and correspondingly the amount of flexing required of the links depends on the accuracy to which the components are made and on the flatness of the table to which the support members have to accommodate themselves as they move during rotation of the mounting. However, it will be clear that the invention enables the use of relatively coarse tolerances and therefore makes possible economical manufacture compared to a single disc.

Also according to this invention there is provided a said rotary mounting in combination with a said flat table, the other member of said radial bearing being secured to said table.

The latter table may be a granite table having a hole extending between said flat upper surface and the underside of the table, said hole accommodating a screw for securing said other member of the radial bearing to the granite table and accommodating a duct for the supply of compressed air to said recesses of the support members.

The mounting may comprise a ring surrounding said one bearing member with radial clearance therebetween, members connecting said ring to said one bearing member and including means for adjusting the radial position of the ring relative to said one bearing member, and said links being secured to said one bearing member through the intermediary of said ring and adjusting means.

Examples of this invention will now be described with reference to the accompany drawings wherein:

FIG. 3 is a section on the line III—III in FIG. 2;

FIG. 4 is a plan view of an alternative mounting;

FIG. 5 is a section on the line V—V in FIG. 4; and

FIG. 6 is another mounting constructed in accordance with the invention.

Figure 1:
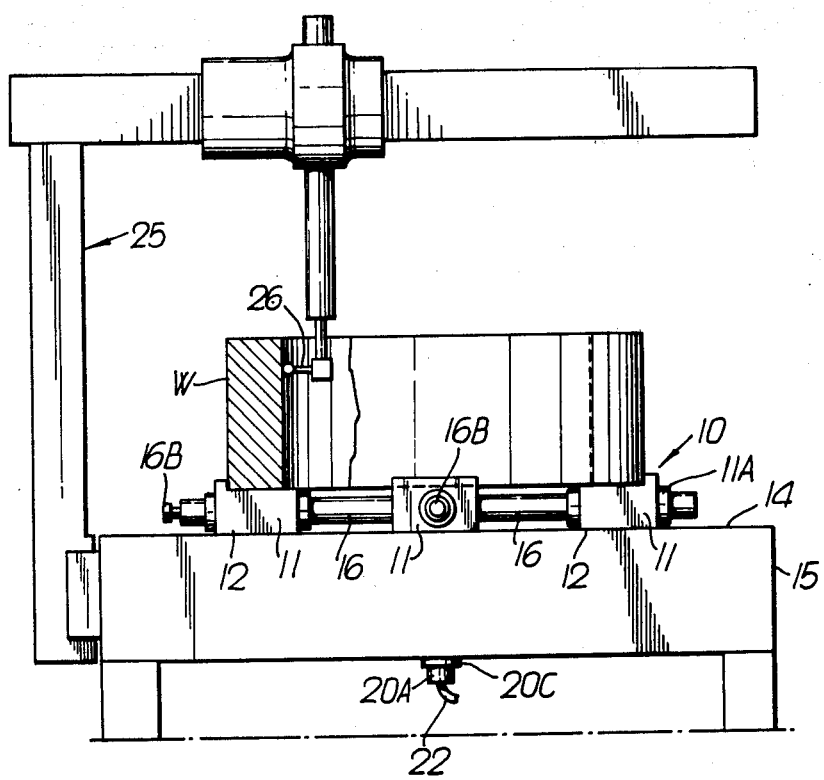
FIG. 1 is an elevation of a measuring machine including a mounting according to the invention.
Figure 2:
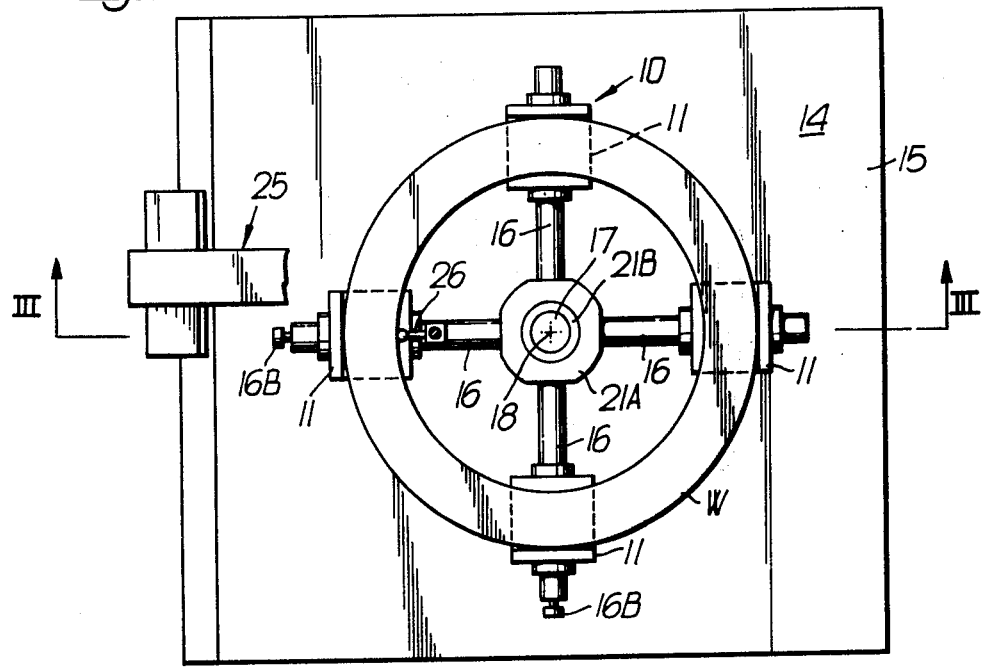
FIG. 2 is a plan view of FIG. 1.

Referring to FIGS. 1, 2 and 3, there is shown a mounting 10 comprising four support members or pads 11, each having a flat support surface 12 having a recess 13 connected to a supply duct 22 for compressed air.

The pads are positioned for their support surfaces to rest on a flat surface 14 of a table 15 and in this way to lie in a common plane. The table is a precision-surfaced table made of granite and forms part of a co-ordinate measuring machine 25 well-known per se. The pads 11 are each connected by a respective link or arm 16 to a radial bearing 17 enabling the arms, and thus the pads, to rotate about an axis 18 perpendicular to the surface 14. A workpiece W to be inspected is supported by the pads as shown.

The recess 13 and the support surface 12 of each pad are intended to form, in combination with the surface 14, an aerostatic bearing 19. Such a bearing requires good parallelism between the surfaces 13,14. To ensure this, the arms 16 are made sufficiently flexible in the direction of the axis 18 to enable the surfaces 12 of all the pads 11 to make full surface contact with the surface 14 under the weight of the workpiece. Basically, the flexibility need only be sufficient to accommodate differences in the height which the individual pads may have above the surface 14 due to manufacturing tolerances in the mounting 10 as a whole. These differences are small in relation to the ability of the arms to bend. Clearly, the longer the arms the easier it will be for a given weight of workpiece to bend the arms for the pads to lie flat against the surface 14. But even quite short arms (which may be made in the form of leaf springs) can be made to suit all practical circumstances. Any other disconformity which the pads may have in relation to the surfaces 14 can be removed by articulate connection between the pads and the arms. In the present example this is done by making the arms of circular cross-section and allowing the pads to rotate about the arms, but any other forms of articulation, e.g. a spherical bearing may be employed.

The bearing 17 has an inner or fixed part 20 secure to the table 15 and an outer or rotary part 21 surrounded by a ring 21A to which the arms 15 are secured. The part 20 has a screw-threaded spigot 20A extending through a hole 20B in the table and secured by a nut 20C at the underside of the table. The duct 22 is connected through the spigot 20A, through a gland 24 between the parts 20,21, and through a radial clearance 21B between the parts 21,21A, to the interior of the arms 16 which are tubular. The arms 16 have holes 16A whereby the air supply is led to the recesses 13.

The part 21 is movable axially relative to the part 20. The part 21 and ring 21A are constrained against relative axial movement by flanges 21C. The ring 21A is supported on the surface 14 by an aerostatic bearing 21D.

The size of the mounting is limited only by the size of the table 15 because the arms 16 can easily be made of any length, if necessary by being made of connected lengths. Any convenient number of pads may be mounted on the respective arms. The mounting has particular application to the measurement of circularity and concentricity of an annular workpiece. For the purpose of such a measurement the workpiece is rotated past a stationary probe 26 connected to the machine 25 (FIG. 1). As mounted on the pads and with the air supply in operation, the force required to rotate the workpiece around axis 18 is minimal and the workpiece can be rotated in a smooth floating way. The bearing 17 is itself an aerostatic bearing of high accuracy to ensure minimal radial error when rotating the workpiece.

The radial position of the workpiece is adjustable by means of two screws 16B provided in two angularly adjacent ones of the arms 16. Each screw 16B extends through the interior length of the arm and has a hand knob 16C at its radially outer end. At its inner end 16D the screw is threaded through the ring 21A into engagement with the periphery of the rotary member 21. Rotation of the screw 16B by the hand knob 16C moves the ring 21A and thus all four arms 16 radially, in respect of the axis 18. The screw 16C and member 21 are maintained in engagement by a spring 16E located between the member 21 and the ring 21A in a position diametrally opposite the screw 16B.

It will be appreciated that operations such as measuring circularity and concentricity require fine-adjustment of concentricity of the workpiece about the axis 18. The arrangement of the screws 16B enables this adjustment to be carried out while the workpiece is supported by the aerostatic bearings 19 so that the radial adjustment can be made with the same ease as the rotation of the workpiece. This is important because during adjustment of concentricity the workpiece has to be alternately rotated and adjusted radially a number of times before the optimum position is reached. The invention greatly facilitates these operations because of the ease with which they can be carried out.

It will be clear that while the arms 16 need to be flexible in the direction of the axis 18 they need to be stiff in the radial direction to maintain the radial position of the workpiece in relation to the axis 18. This stiffness is given essentially by ensuring that the arms are moderately straight so that the radial loads occur as compressive loads, i.e. loads against which the arms 11 would be intrinsically strong. Naturally, the pads 11 must not be freely movable on the arms 11 and clamps 11A are provided to secure the pads to the arms. The clamps are releasable to allow the pads to be slid along the arms for adjustment in relation to the workpiece. When locked, the clamps nevertheless allow the pads to pivot about the arms to allow for the above-mentioned articulation.

The mounting shown in FIGS. 4 and 5 comprises nine aerostatic bearing pads 30 joined together to form a square in plan view and capable of rotation about a central bearing 31 provided in the central one of the pads 30. An air supply for all the pads and for the central bearing 31 is provided by a supply duct 32 to the bearing 31. The bearing 31 in the central pad 30 comprises a central portion 33 fixed to a granite table 34 on which all the pads rest. The portion 33 has an annular recess 35 to which the air from duct 32 is supplied. The air from recess 35 forms a radial aerostatic bearing between the rotatable portion 36 and the central pad 30. The recess 35 also communicates air to each of the four adjoining pads 30 and these in turn communicate air to the four corner pads 30. The air communication from the central pad 30 is via a tube 37 which is sealed at each end by an encircling 'O' ring seal 38 in a manner which allows a certain amount of vertical freedom between adjacent pads 30 whilst still providing a seal. Air supplied through the tube 37 passes to a passage 39 and through downwardly extending passages 40 to feed the aerostatic bearing between the respective pads and the granite surface 34. Similar tubes 37 connect each of the four adjoining pads 30 with the central pad 30 and other tubes 37 connect each corner pad 30 with its two adjacent pads.

The central pad 30 is connected to each adjacent pad 30 by two flexible links 41 which prevent relative movement between adjacent pads in the plane of the surface 34 but enable any pad 30 to move vertically relative to an adjacent pad 30. Each strip 41 extends into a recess in two adjacent pads 30 and is clamped in that recess by a screw 42 in each pad 30.

FIG. 4 shows two links 41 between the central pad 30 and each of two adjacent pads 30. Similar links 41 may be provided between all adjacent pads 30 or the nine pads 30 may be joined by a spring 41A which defines four links and which encompasses the four adjacent corners of four of the pads 30.

Referring now to FIG. 6 there is shown an array of six hexagonally-shaped pads 50 arranged around a central such pad. The central pad has a rotatable bearing 31 identical to the bearing shown in FIG. 4 and similar air supply tubes 37' connect the central pad 50 with each adjoining pad 50 and connect between adjoining pads 50. Flexible links 41' connect three adjoining pads 50 in a similar manner to the links 41 of FIG. 4.

We claim:

1. A rotary mounting for use on a base having a flat upper surface, the mounting comprising a radial bearing having two bearing members relatively rotatable about a common axis, a plurality of workpiece support members having respective flat support surfaces by which the mounting is engageable, in use, with said flat upper surface of the base, each support member having in the support surface thereof a recess connectable, in use, to a supply of compressed air, and links connecting each said support member to one of said bearing members.

2. Mounting accordng to claim 1 wherein said links are elongate in a direction transverse to said axis and are rigid in the direction of their length but are flexible in the direction of said axis.

3. Mounting according to claim 1 comprising a ring surrounding said one bearing member with radial clearance therebetween, members connecting said ring to said one bearing member and including means for adjusting the radial position of the ring relative to said one bearing member, and said links being secured to said one bearing member through the intermediary of said ring and adjusting means.

4. Mounting according to claim 1, in combination with a flat table, the other member of said radial bearing being secured to said table.

5. Mounting according to claim 4, said flat table having a hole extending between said flat upper surface thereof and the underside thereof, said hole accommodating a screw for securing the other member of the radial bearing to the table and accommodating a duct for the supply of compressed air to said recesses of the support members.

6. A rotary mounting for use on a base having an upper surface, the mounting comprising a radial bearing having two bearing members relatively rotatable about a common axis, a plurality of workpiece support members spaced from said bearing in a plane perpendicular to said axis and having respective support surfaces by which the mounting is supportable, in use, on said upper surface, each support member having at the support surface thereof an aerostatic support means co-operating, in use, to establish aerostatic support for the support members on said upper surface, and link means connected between the respective support members and one of the bearing members thereby to locate the support members relative to said one bearing member.

7. Mounting according to claim 6 wherein said link means comprises arms connected between said one bearing member and the respective support members, and wherein each of said arms is flexible in the direction of said axis at least to the extent of allowing said support members to accommodate themselves, in use, to said upper surface for the purpose of establishing said aerostatic support.

8. Mounting according to claim 6, wherein said link means comprises arms connected between said one bearing member and the respective support members, and articulate means provides between each arm and the respective support member to enable the support member to accommodate itself, in use, to said upper surface to facilitate establishment of said aerostatic support.

9. Mounting according to claim 6 comprising air passages leading from the other one of said bearing members through said one bearing member to each said support member for the supply of compressed air to said aerostatic support means.

10. Mounting according to claim 9 wherein said link means comprises in respect of each said support member an arm connected between the support member and said one bearing member, the arm defining at the interior thereof an air passage connected between said one bearing member and said aerostatic support means of the support member for the supply of compressed air to said aerostatic support means.

11. Mounting according to claim 6 comprising an adjusting member connected to said one bearing member, means for adjusting the radial position of the adjusting member relative to said one bearing member, and said link means being connected between said support members and said adjusting member.

12. Mounting according to claim 11 wherein said adjusting means comprises a screw connected between the adjusting member and said one bearing member and being rotatable to move the adjusting member and thus the support members radially with respect to said one bearing member, said screw having an end supported on one of the support members and projecting therefrom to be accessible for rotation.

* * * * *